United States Patent
Rotstein et al.

(10) Patent No.: US 7,313,205 B2
(45) Date of Patent: Dec. 25, 2007

(54) METHOD AND APPARATUS FOR FREQUENCY CORRECTION IN WIRELESS LOCAL AREA NETWORK SYSTEMS

(75) Inventors: Ron Rotstein, Arlington Heights, IL (US); Arie Z. Schwartzman, Palatine, IL (US)

(73) Assignee: Motorola, Inc., Schaumburg, IL (US)

( * ) Notice: Subject to any disclaimer, the term of this patent is extended or adjusted under 35 U.S.C. 154(b) by 703 days.

(21) Appl. No.: 10/813,448

(22) Filed: Mar. 30, 2004

(65) Prior Publication Data

US 2005/0220225 A1    Oct. 6, 2005

(51) Int. Cl.
    *H04L 27/00*    (2006.01)
(52) U.S. Cl. ...................................... 375/326
(58) Field of Classification Search ................ 375/316, 375/326, 327, 344, 371–376; 329/307–309; 455/192.1, 192.2, 192.3, 182.1
    See application file for complete search history.

(56) References Cited

U.S. PATENT DOCUMENTS

| | | | |
|---|---|---|---|
| 4,707,653 A * | 11/1987 | Wagner | 324/76.63 |
| 5,457,716 A * | 10/1995 | Ang et al. | 375/344 |
| 6,233,292 B1 * | 5/2001 | Van Bezooijen et al. | 375/344 |
| 6,493,397 B1 * | 12/2002 | Takahashi et al. | 375/285 |
| 7,187,731 B2 * | 3/2007 | Popper | 375/344 |
| 7,190,748 B2 * | 3/2007 | Kim et al. | 375/345 |
| 7,242,720 B2 * | 7/2007 | Sugiyama et al. | 375/260 |
| 2002/0191535 A1 * | 12/2002 | Sugiyama et al. | 370/208 |
| 2003/0185158 A1 | 10/2003 | Lucas | |
| 2004/0137851 A1 * | 7/2004 | Akhter et al. | 455/71 |
| 2004/0156423 A1 * | 8/2004 | Li et al. | 375/148 |

FOREIGN PATENT DOCUMENTS

WO    WO 03/084162 A1    10/2003

* cited by examiner

*Primary Examiner*—Tesfaldet Bocure
(74) *Attorney, Agent, or Firm*—Randi L. Karpinia

(57) ABSTRACT

A method and apparatus for frequency correction of a signal in a wireless local area network (WLAN) communication system is disclosed. The signal is processed to determine a frequency offset estimate which is a frequency deviation of the signal from a local oscillator. The signal is then shifted by an amount corresponding to a frequency correction estimate where the frequency correction estimate is an averaged value of the frequency offset estimate and at least one prior frequency offset estimate. Finally, the frequency correction estimate is utilized to correct signals in the WLAN communication system.

10 Claims, 2 Drawing Sheets

100

METHOD AND APPARATUS FOR FREQUENCY CORRECTION IN WIRELESS LOCAL AREA NETWORK SYSTEMS

FIELD OF THE INVENTION

The present invention relates generally to communication systems and in particular, to the field of wireless local area network (WLAN) systems.

BACKGROUND OF THE INVENTION

Local area networks (LANs) allow organizations to share information over a high speed network that may be assembled with relatively inexpensive hardware components. Until recently, LANs were limited to hardwired infrastructure, requiring the user to physically connect to the LAN via a wired connection. However, with the recent growth of wireless telephony and wireless messaging, wireless communications have also been applied to the realm of LANs, resulting in the development of wireless local area networks (WLANs). Like typical LANs, WLAN systems also provide high performance with relatively inexpensive hardware components at a low cost point. One of the biggest challenges in designing a low cost WLAN communication system is designing a WLAN receiver that accurately matches the frequency of the WLAN receiver to a WLAN transmitter.

IEEE 802.11a specifies an over-the-air interface between WLAN receivers and WLAN transmitters so that communications can take place in spite of the challenge of accurately matching the frequency of the WLAN receiver to the WLAN transmitter. Specifically, IEEE 802.11a specifies that at 5 GHz, with data speeds of up to 54 Mbps where each data channel is 20 MHz, a crystal may be utilized in the WLAN receiver and the WLAN transmitter so that a tolerance of 20 ppm is met. Further, the standard provides for the use of a digital frequency corrector to compensate for this error because this error generally increases over time and can approach 40 ppm. The digital frequency corrector takes a frequency estimate generated by a preamble and training sequence block to correct a received signal. The problem with the IEEE 802.11a solution is that the frequency estimate provided by the digital frequency corrector is imperfect and over time the digital frequency corrector causes the transmission channel to become quite noisy. As a result, the degradation in the quality of the frequency estimate contributes to performance degradation of the WLAN communication system.

The problem is more acute where narrower channels are used. For example, a 4.9 GHz Mission Critical Local Broadband (MCLB) system specifies channels of bandwidth 5 MHz, a proposed IEEE standard 802.11j specifies channels of bandwidth 10 MHz, and a 5.9 MHz Digital Short Range Communication (DSRC) system requires channels of bandwidth 10 MHz. Narrower channels necessarily require more accurate crystals for communications to take place and more accurate crystals currently cost more. For example, for a 5 MHz channel, a crystal with a tolerance of 10 ppm is required. The requirement of low cost is inapposite to the requirement of accurate crystals.

A further problem with more accurate crystals, such as crystals below 10 ppm, is that they require thermal stabilization and call for significant power requirements. Such requirements typically are cost prohibitive and/or difficult to meet by the hardware currently available for WLAN receivers and WLAN transmitters.

While the existing method of providing frequency correction in a WLAN communication system is relatively satisfactory, overtime the method causes performance degradation of the WLAN communication system. Accordingly, there exists a need for a better method and apparatus that permits frequency correction in a WLAN communication system.

BRIEF DESCRIPTION OF THE FIGURES

A preferred embodiment of the invention is now described, by way of example only, with reference to the accompanying figures in which.

Figure 1:
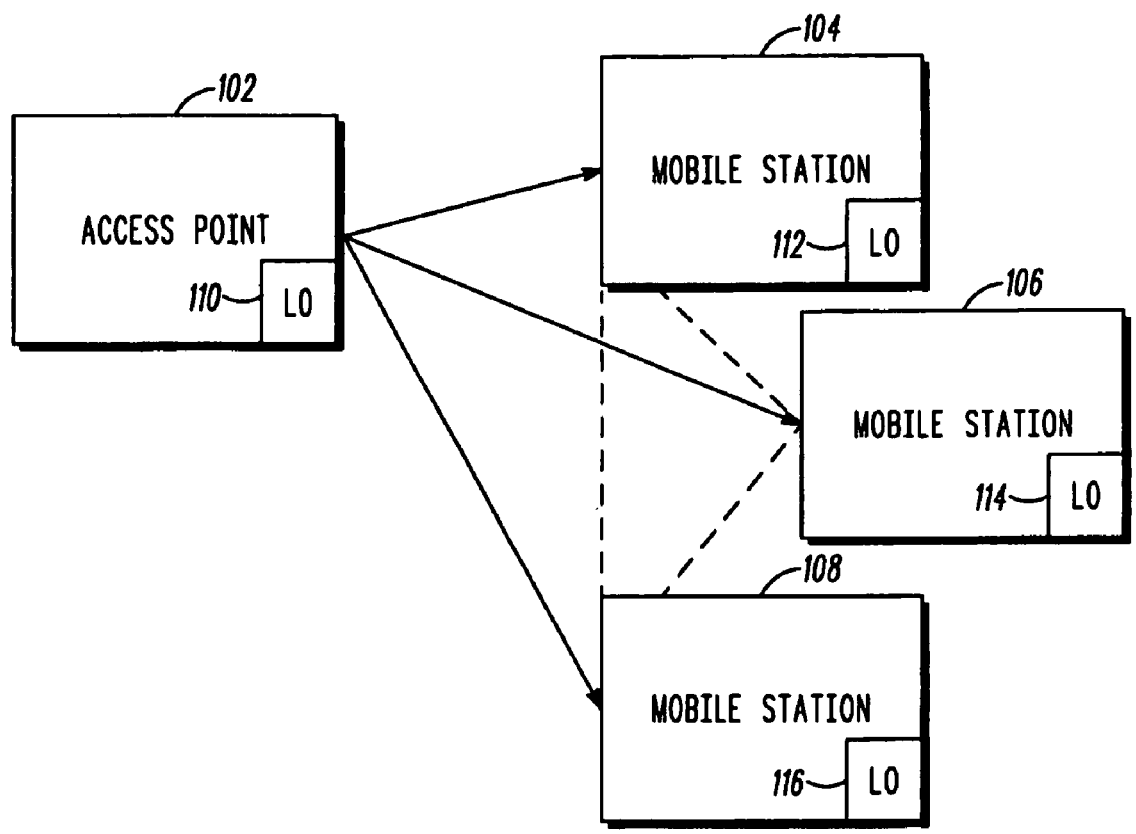
FIG. 1 is a block diagram illustrating a typical WLAN communication system.

It will be appreciated that for simplicity and clarity of illustration, elements shown in the figures have not necessarily been drawn to scale. For example, the dimensions of some of the elements are exaggerated relative to each other. Further, where considered appropriate, reference numerals have been repeated among the figures to indicate identical elements.

DETAILED DESCRIPTION OF THE PREFERRED EMBODIMENT

FIG. 1 is a block diagram of an exemplary wireless local area network (WLAN) communication system 100. WLAN communication system 100 comprises an Access Point (AP) 102 and multiple mobile stations 104, 106, 108. When a mobile station 104 wishes to access the WLAN communication system 100, the mobile station 104 must first establish and configure a link with the AP 102. The mobile station 104 scans the available frequencies and directly communicates with AP 102 on a common frequency channel. To communicate both the mobile station 104 and the AP 102 generally utilize a local oscillator 110, 112, 114, 116 tuned to the common frequency channel. The local oscillators 110, 112, 114, 116 generally use a crystal to generate the common frequency.

Figure 2:
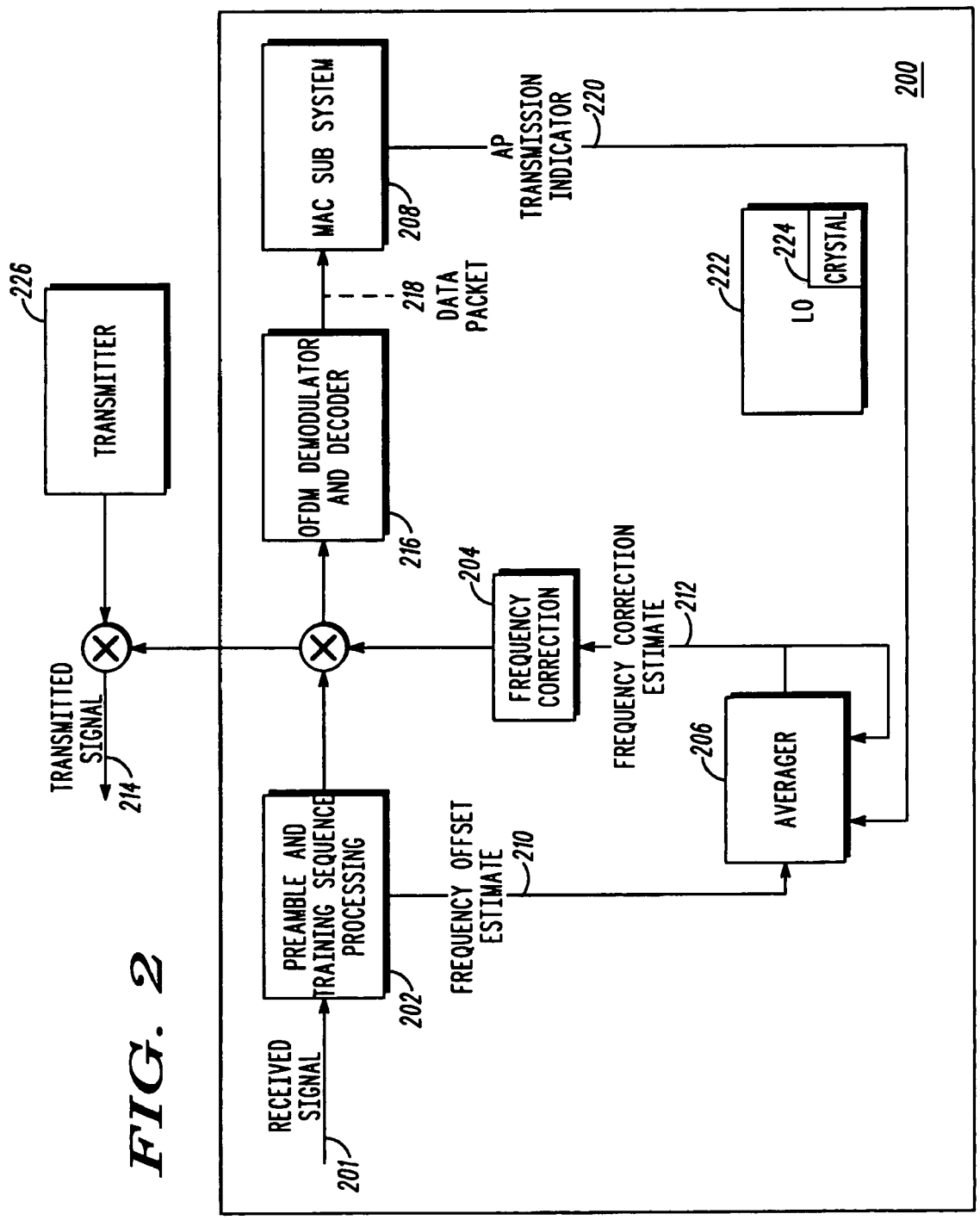
FIG. 2 is a block diagram illustrating a receiver and transmitter according to an embodiment of the present invention.

An example of a receiver 200 which can be incorporated into elements of a WLAN communication system such as a mobile station 104 and an AP 102 is shown in FIG. 2. The receiver 200 functions to isolate a received signal 201. A further embodiment of the present invention is to incorporate the receiver 200 and the transmitter 226 into one product called a transceiver (not shown). As is known to one of ordinary skill in the art, a transceiver functions to process received signals and to transmit signals in the WLAN communication system 100.

Referring to the embodiment shown in FIG. 2, after an initial processing of the received signal 201 by a preamble and training sequence block 202, the receiver 200 obtains information required to match the estimated timing, phase and frequency of the received signal 201. A product of this processing is a frequency offset estimate 210 which approximates the deviation in frequency in the received signal 201 from the local oscillator 222. In a preferred embodiment, the frequency offset estimate 210 is input to an averager 206 which averages the frequency offset estimate 210 to calculate a frequency correction estimate 212. The averager 206 functions as an arithmetic mean of more than one frequency offset estimate 212. The averager 206 takes the frequency offset estimate 210 and a previously stored frequency correction estimate, if available, to calculate a new average, namely frequency correction estimate 212 which is used for the correction of the received signal 201. The frequency correction estimate 212 is input to a frequency correction 204 to correct the received signal 201 and match the received signal 201 with the reference generated by a crystal 224 (also known as a crystal reference) of the local oscillator 222.

Correction of the received signal means to shift the received signal 201 in frequency by the frequency correction estimate 212. For example, if there is a 50 KHz difference between the crystal reference in a WLAN transmitter, such as transmitter 226, and the crystal reference in a WLAN receiver, such as receiver 200, the frequency offset estimate 210 will be approximately 50 KHz. In reality, the frequency offset estimate 210 is a combination of 50 KHz and a first noise component and can be described mathematically as follows.

Frequency offset estimate=50 KHz+noise 1

After the averager 206, the frequency correction estimate will be approximately 50 KHz plus a second noise component and can be described mathematically as follows.

Frequency correction estimate=50 KHz+noise 2

The received signal 201 will be moved back in frequency by the frequency correction estimate of 50 KHz plus the second noise component, e.g. −(50 KHz+noise 2) to match the received signal 201 to the crystal reference 224. Due to the averaging effect of the averager 206, the second noise component is less than the first noise component, so the frequency correction estimate 212 is more accurate than without using the average 206. The second noise component being less than the first noise component means that the receiver 200 compensates for the noise introduced by WLAN communication system 100.

Once the received signal 201 is corrected, an OFDM demodulator 216 converts the received signal 201 into digital form and retrieves a data packet 218. The data packet 218 is processed by a MAC sub system block 208 where the MAC sub system block 208 determines the source of the data packet 218. If the source of the data packet 218 is the AP 102, then the averager 206 is updated with the recently calculated frequency correction estimate 212 and stored in a memory of the receiver 200. In an embodiment of the present invention, an AP transmission indicator signal 220 output from the MAC subsystem 208 functions to trigger the averager 206 to update its stored value of the frequency correction estimate 212 and to increment a variable specifying a number of received signals.

In an embodiment of the present invention, the averager 206 calculates the frequency correction estimate 212 by a moving average calculation. As is known to one or ordinary skill in the art, the frequency correction estimate 212 may also be performed by a sliding windows method, a weighted average, a leaky integrator method, and other averaging methods resulting in an averaging effect. In an embodiment of the present invention, the moving average calculation is performed as follows:

Frequency Correction Estimate 212 =

$$\frac{PreviousFrequencyCorrectionEstimtae \times NumberOfSignalsAveraged + FrequencyOffsetEstimate\ 210}{NumberOfSignalsAveraged + 1}$$

Over time, as more communications are received from the AP 102, the more accurate the frequency correction estimate 212 becomes since the frequency correction estimate 212 is an average of numbers. The frequency at which the AP 102 transmits is stable and immune to changes in the WLAN communication system 100, so over time the frequency correction estimate 212 will also become stable and not change. Hence, the frequency correction estimate 212 becomes more accurate with time.

In another embodiment of the present invention, the frequency correction estimate 212 is also used to correct the transmitted signal 214. The frequency correction of the transmitted signal 214 is done in a similar manner to the frequency correction of the received signal 201, but with an opposite sign. For example, if there is a 50 KHz difference between the crystal reference in the WLAN transmitter, such as transmitter 226 in the AP 102, and the crystal reference in the WLAN receiver, such as receiver 200, the frequency offset estimate 210 will be approximately 50 KHz. In reality, the frequency offset estimate 210 is a combination of 50 KHz and a first noise component and can be described mathematically as follows.

Frequency offset estimate=50 KHz+noise1

After the averager 206, the frequency correction estimate 212 will be 50 KHz plus a second noise component and can be described mathematically as follows.

Frequency correction estimate=50 KHz+noise2

A frequency correction circuit in the WLAN transmitter, such as transmitter 226, will move the transmitted signal 214 forward in frequency by an amount equal to the frequency correction estimate 212, e.g. +(50 Khz+noise2) to match the transmitted signal 214 to the local crystal 110 of the AP 102.

Overtime, as more communications occur between the mobile stations 104, 106, 108 and the AP 102, the mobile stations 104, 106, 108 appear to be locked in frequency with the AP 102. When this occurs, the mobile stations 104, 106, 108 can then communicate with each other without the assistance of the AP 102 because the mobile stations 104, 106, 108 have locked their frequencies to the AP 102. In addition, the mobile stations 104, 106, 108 can communicate through the AP 102. In one embodiment, if the mobile stations 104, 106, 108 communicate directly with each other, the averager 206 is not updated. The mobile stations 104, 106, 108 need only to use the frequency correction estimate 212 that is stored in the averager 206.

From the perspective of users external to the WLAN communication system 100, the mobile stations 104, 106, 108 are locked in frequency with the AP 102. The frequency of the AP 102 has become the reference for the mobile stations 104, 106, 108. By performing the frequency correction 204 based upon a frequency correction estimate 212 which is an averaged value of more than one frequency offset estimate 210, the mobile stations 104, 106, 108 can not only communicate with the AP 102 but with each of the other mobile stations 104, 106, 108.

In an exemplary embodiment, an advantage of performing the frequency correction 204 based upon utilizing a frequency correction estimate 212 which is an averaged value of more than one frequency offset estimate 210 is that the mobile stations 104, 106, 108 no longer need an accurate crystal, such as in LO 112, 114, 116. By relying on the AP 102 to provide the reference frequency, it no longer matters whether the crystal in the mobile stations 104, 106, 108 is accurate. An embodiment of the present invention provides the mechanism to improve the frequency offset estimate 212 to the degree that mobile stations 104, 106, 108 no longer need an accurate crystal.

By not needing an accurate crystal, the mobile stations 104, 106, 108 are relieved from significant power requirements that an accurate crystal demands and are further relieved from needing hardware for thermal stabilization of an accurate crystal. A side benefit of not needing an accurate crystal is that the cost of the mobile stations 104, 106, 108 is reduced which is advantageous to building low cost mobile stations 104, 106, 108.

The embodiment of FIG. 2 may be used in either the AP 102 or the mobile stations 104, 106, 108. In a preferred embodiment, the embodiment of FIG. 2 is incorporated into the mobile stations 104, 106, 108 to decrease the cost of the mobile stations 104, 106, 108.

While the invention has been described in conjunction with specific embodiments thereof, additional advantages and modifications will readily occur to those skilled in the art. The invention, in its broader aspects, is therefore not limited to the specific details, representative apparatus, and illustrative examples shown and described. For example, the subscriber unit and/or the base radio may comprise a storage medium having stored thereon a set of instructions which, when loaded into a hardware device (e.g., a microprocessor), causes the hardware device to perform the following functions of the present invention. The present invention can be implemented in at least one of hardware, firmware and/or software. Various alterations, modifications and variations will be apparent to those skilled in the art in light of the foregoing description. Thus, it should be understood that the invention is not limited by the foregoing description, but embraces all such alterations, modifications and variations in accordance with the spirit and scope of the appended claims.

It should be noted that the term "a" or "an", as used herein, are defined as one or more than one. The term "plurality", as used herein, defined as two or more than two. The term "another", as used herein, is defined as at least a second or more. The terms "including" and/or "having", as used herein, are defined as comprising (i.e., open language).

We claim:

1. A method for frequency correction of a received signal, comprising the steps of:
   receiving a signal from a transmitter in a WLAN communication system whereby the WLAN communication system comprises a single channel for receiving and transmitting signals;
   processing the received signal to determine a frequency offset estimate wherein the frequency offset estimate is a frequency deviation of the received signal from a local oscillator;
   computing a frequency correction estimate by averaging the frequency offset estimate associated with the received signal with a previously stored frequency correction estimate, whereby the previously stored frequency correction estimate is an averaged value of the frequency offset estimate and at least one prior frequency offset estimate; and
   shifting the received signal by an amount corresponding to the frequency correction estimate to correct the received signal from the transmitter.

2. The method of claim 1 wherein the step of receiving further comprises the step of determining whether the received signal is from an access point of a wireless network and if the received signal is from the access point then performing the subsequent steps of the method.

3. The method of claim 2 wherein the step of determining further comprises decoding a source field of a message encompassed in the received signal to determine a source of the message.

4. The method of claim 1 wherein the method is performed by a receiver of a wireless local area network wherein the receiver is encompassed in an access point and a mobile station.

5. A method for frequency correction of a transmitted signal comprising the steps of:
   transmitting a signal from a transmitter in a WLAN communication system whereby the WLAN communication system comprises a single channel for receiving and transmitting signals;
   processing the signal to be transmitted to determine a frequency offset estimate wherein the frequency offset estimate is frequency deviation of the transmitted signal from a local oscillator;
   computing a frequency correction estimate by averaging the frequency offset estimate associated with the transmitted signal with a previously stored frequency correction estimate, whereby the previously stored frequency correction estimate is an averaged value of the frequency offset estimate and at least one prior frequency offset estimate; and
   shifting the signal to be transmitted by an amount corresponding to the frequency correction estimate to correct signals to be transmitted from the transmitter.

6. The method of claim 5 wherein the method is performed by the transmitter of a wireless local area network wherein the transmitter is encompassed in an access point and a mobile station.

7. A system for frequency correction in a wireless local area network, such system comprising:
   a preamble and training sequence processor configured to receive a signal from a transmitter in the wireless local area network and outputting a frequency offset estimate wherein the frequency offset estimate is a frequency deviation of the received signal from a local oscillator;
   an averager coupled to the output of the preamble and training sequence processor where the averager provides a frequency correction estimate based upon a mathematical average of the frequency offset estimate provided by the preamble and training sequence processor and a previously stored frequency correction estimate, whereby the previously stored frequency correction estimate is an averaged value of the frequency offset estimate and at least one prior frequency offset estimate; and
   a frequency corrector which shifts the received signal by an amount corresponding to the frequency correction estimate to output a corrected received signal.

8. The system of claim 7 wherein the system is embodied in elements of the wireless local area network comprising an access point and a mobile station.

9. A system for frequency correction in a wireless local area network, such system comprising:
   a preamble and training sequence processor configured to receive a signal from a transmitter in the wireless local area network and outputting a frequency offset estimate wherein the frequency offset estimate is a frequency deviation of the received signal from a local oscillator;
   an averager coupled to the output of the preamble and training sequence processor, where the averager provides a frequency correction estimate based upon a mathematical average of the frequency offset estimate provided by the preamble and training sequence processor and at least one prior frequency offset estimate;
   a frequency corrector which shifts the received signal by an amount corresponding to the frequency correction estimate to output a corrected received signal; and a MAC subsystem coupled to the input of the averager to determine a source of a message of the received signal wherein the MAC subsystem causes the averager to provide a frequency correction estimate if the source of the message is an access point.

10. A system for frequency correction in a wireless local area network, such system comprising:

means for receiving a signal from a transmitter in a WLAN communication system whereby the WLAN communication system comprises a single channel for receiving and transmitting signals;

means for processing the received signal to determine a frequency offset estimate wherein the frequency offset estimate is a frequency deviation of the received signal from a local oscillator;

means for computing a frequency correction estimate by averaging the frequency offset estimate associated with the received signal with a previously stored frequency correction estimate, whereby the previously stored frequency correction estimate is an averaged value of the frequency offset estimate and at least one prior frequency offset estimate; and means for shifting the received signal by an amount corresponding to the frequency correction estimate to correct the received signal from the transmitter.

* * * * *